(12) United States Patent
Ramanujan et al.

(10) Patent No.: US 6,407,766 B1
(45) Date of Patent: Jun. 18, 2002

(54) METHOD AND APPARATUS FOR PRINTING TO A PHOTOSENSITIVE MEDIA USING MULTIPLE SPATIAL LIGHT MODULATORS

(75) Inventors: Sujatha Ramanujan, Pittsford; David Kessler, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/618,661

(22) Filed: Jul. 18, 2000

(51) Int. Cl.$^7$ .................................................. B41J 2/47
(52) U.S. Cl. ...................................... 347/239; 347/255
(58) Field of Search ................................. 347/239, 241, 347/255, 256, 237, 247; 353/20, 122; 349/5, 9; 359/494; 430/321; 355/67

(56) References Cited

U.S. PATENT DOCUMENTS

| | | | |
|---|---|---|---|
| 4,728,965 A | 3/1988 | Kessler et al. ............... 347/241 |
| 5,061,049 A | 10/1991 | Hornbeck .................... 359/224 |
| 5,325,137 A | 6/1994 | Konno et al. ................. 353/63 |
| 5,379,135 A | * 1/1995 | Nakagaki et al. ................ 349/9 |
| 5,461,410 A | 10/1995 | Venkateswar et al. ....... 347/240 |
| 5,461,411 A | 10/1995 | Florence et al. ............ 347/240 |
| 5,504,514 A | 4/1996 | Nelson ........................ 347/130 |
| 5,517,340 A | * 5/1996 | Doany et al. .................... 349/5 |
| 5,521,748 A | 5/1996 | Sarraf ......................... 359/321 |
| 5,652,661 A | 7/1997 | Gallipeau et al. ........... 358/302 |
| 5,701,185 A | 12/1997 | Reiss et al. .................. 358/471 |
| 5,721,622 A | 2/1998 | Venkateswar ................ 358/298 |
| 5,743,610 A | 4/1998 | Yajima et al. ................. 353/31 |
| 5,743,612 A | 4/1998 | Matsuda et al. ............... 353/97 |
| 5,745,156 A | 4/1998 | Federico et al. .............. 345/98 |
| 5,754,217 A | 5/1998 | Allen ........................... 347/239 |
| 5,754,305 A | 5/1998 | DeClerck et al. ........... 358/302 |
| 5,777,789 A | * 7/1998 | Chiu et al. ................... 359/494 |
| 5,805,274 A | 9/1998 | Saita ............................ 355/38 |
| 6,133,986 A | * 10/2000 | Johnson ....................... 355/67 |
| 6,183,091 B1 | * 2/2001 | Johnson et al. ................ 353/20 |
| 6,232,045 B1 | * 5/2001 | Jacobowitz et al. ........ 430/321 |
| 6,273,571 B1 | * 8/2001 | Sharp et al. ................. 353/122 |

* cited by examiner

*Primary Examiner*—Hai Pham
(74) *Attorney, Agent, or Firm*—Nelson Adrian Blish

(57) ABSTRACT

A method of printing (10) to a photosensitive media contains the step of imaging light from a light source through an optics assembly to a polarization beamsplitter (80). The polarization beamsplitter (80) produces a first polarized state and a second polarized state. The first polarized state is directed to a first filter to a first spatial light modulator. The first spatial light modulator is addressed with a first color signal to modulate the first polarized beam which is reflected back through the polarization beamsplitter (80). A second polarized light is passed through a second filter to a second spatial light modulator. A second color signal causes said second spatial light modulator to reflect a second modulated light beam through the polarization beamsplitter (80). The first and second modulated light beam are focused through print lens (110) onto a photosensitive media.

18 Claims, 7 Drawing Sheets

METHOD AND APPARATUS FOR PRINTING TO A PHOTOSENSITIVE MEDIA USING MULTIPLE SPATIAL LIGHT MODULATORS

CROSS REFERENCE TO RELATED APPLICATIONS

Reference is made to commonly assigned copending U.S. patent application Ser. No. 09/197,328, filed Nov. 19, 1998, entitled REFLECTIVE LIQUID CRYSTAL MODULATOR BASED PRINTING SYSTEM, by Ramanujan et al.; copending U.S. patent application Ser. No. 09/470,930, filed Dec. 22, 1999, entitled A METHOD AND APPARATUS FOR PRINTING HIGH RESOLUTION IMAGES USING REFLECTIVE LIQUID CRYSTAL DEVICES, by Ramanujan et al., the disclosures of which are incorporated herein.

FIELD OF THE INVENTION

This invention relates generally to an apparatus and method for spatially and temporally modulating a light beam and imaging the modulated light onto a photosensitive media.

BACKGROUND OF THE INVENTION

Photographic images are traditionally printed onto photographic paper using conventional film based optical printers. The photographic industry is converting to digital imaging. One step in the digital imaging process uses images obtained from digital cameras or scanned film exposed in traditional photographic cameras to create digital image files that are then printed onto photographic paper.

The growth of the digital printing industry has led to multiple approaches to digital printing. One of the early methods used for digital printing was cathode ray tube (CRT) based printers such as the Centronics CRT recorder. This technology has several limitations related to the phosphor and the electron beam. The resolution of this technology is inadequate when printing a large format images, such as 8 inch by 10 inch photographic print. CRT printers also tend to be expensive, which is a severe short coming in a cost sensitive market. An additional limitation is that CRT printers do not provide sufficient red exposure to the media when operating at frame rates above 10,000 prints per hour.

Another commonly used approach to digital printing is the laser based engine as shown in U.S. Pat. No. 4,728,965. Such systems are generally polygon flying spot systems which use red, green, and blue lasers. Unfortunately, as with CRT printers, the laser based systems tend to be expensive, since the cost of blue and green lasers remains quite high. Additionally, the currently available lasers are not compact. Another problem with laser based printing systems is that the photographic paper used for traditional photography is not suitable for a color laser printer due to reciprocity failure. High intensity reciprocity failure is a phenomenon by which photographic paper is less sensitive when exposed to high light intensity for a short period. For example, flying spot laser printers expose each of the pixels for a fraction of a microsecond, whereas optical printing systems expose the paper for the duration of the whole frame time, which can be on the order of seconds. Thus, a special paper is required for laser printers.

A more contemporary approach uses a single spatial light modulator such as a Texas Instruments digital micromirror device (DMD) as shown in U.S. Pat. No. 5,061,049. Spatial light modulators provide significant advantages in cost as well as allowing longer exposure times, and have been proposed for a variety of different printing systems from line printing systems such as the printer depicted in U.S. Pat. No. 5,521,748, to area printing systems such as the system described in U.S. Pat. No. 5,652,661. One approach to printing using the Texas Instruments DMD shown in U.S. Pat. No. 5,461,411 offers advantages such as longer exposure times using light emitting diodes (LED) as a source. See U.S. Pat. No. 5,504,514. However, this technology is very specific and not widely available. As a result, DMDs are expensive and not easily scaleable to higher resolution. Also, the currently available resolution is not sufficient for all printing needs.

Another low cost solution uses LCD modulators. Several photographic printers using commonly available LCD technology are described in U.S. Pat. Nos. 5,652,661; 5,701,185; and 5,745,156. Most of these involve the se of a transmissive LCD modulator, for example U.S. Pat. Nos. 5,652,661 and 5,701,185. While such a method offer several advantages in ease of optical design for printing, there are several drawbacks to the use of conventional transmissive LCD technology. Transmissive LCD modulators generally have reduced aperture ratios and the use of Transmissive Field-Effect-Transistors (TFT) on glass technology does not promote the pixel to pixel uniformity desired in many printing applications. Furthermore, in order to provide large numbers of pixels, many high resolution transmissive LCDs possess footprints of several inches. Such a large footprint can be unwieldy when combined with a print lens. As a result, most LCD printers using transmissive technology are constrained to either low resolution or small print sizes. Also, to print high resolution 8 inch by 10 inch images with at least 300 pixels per inch requires 2400 by 3000 pixels. Transmissive LCD modulators with such resolutions are not readily available. Furthermore, each pixel must have a gray scale depth to render a continuous tone print and do so uniformly over the frame size, which is not available in this technology.

An alternate approach is to utilize reflective LCD modulators as is widely accepted in the display market. Most of the activity in reflective LCD modulators has been related to projection display. The projectors are optimized to provide maximum luminous flux to the screen with secondary emphasis placed on contrast and resolution. To achieve the goals of projection display, most optical designs use high intensity lamp light sources. Additionally, many projector designs use three reflective LCD modulators, one for each of the primary colors, such as the design shown in U.S. Pat. No. 5,743,610. Using three reflective LCD modulators are both expensive and cumbersome. For projectors using a single reflective LCD modulator, color sequential operation is required. To maintain the high luminosity in combination with the color sequential requirements, a rotating color filter wheel is sometimes employed. This is yet another large, moving part, which further complicates the system.

The recent advent of high resolution reflective LCDs with high contrast greater than 100:1, presents possibilities for printing that were previously unavailable. See U.S. Pat. Nos. 5,325,137 and 5,805,274. Specifically, a printer may be based on a reflective LCD modulator illuminated sequentially by red, green and blue, light emitting diodes. The reflective LCD modulator may be sub-apertured and dithered in two or three directions to increase resolution.

Dithering has been applied to transmissive LCD systems due to the already less than perfect fill factor. Incorporating dithering into a reflective LCD printing system would allow high resolution printing while maintaining a small footprint. Also, because of the naturally high fill factor present in many reflective LCD technologies, the dithering can be omitted with no detriment to the continuity of the printed image.

The use of a reflective LCD serves to significantly reduce the cost of the printing system. Furthermore, the use of an area reflective LCD modulator sets the exposure times at sufficient length to avoid or significantly reduce reciprocity failure. The progress in the reflective LCD device field made in response to needs of the projection display industry have provided opportunities in printing applications. Thus, a reflective LCD modulator designed for projection display can be incorporated into the printing design with little modification to the LCD itself. Also, by designing an exposure system and data path with an existing projection display device allows incorporation of an inexpensive commodity item into a print engine.

Of the reflective LCD technologies, the most suitable to this design is one which incorporates a small footprint with an integrated Complementary Metal Oxide Semiconductor (CMOS) backplane. The compact size along with the uniformity of drive offered by such a device will translate into better image quality than other LCD technologies. There has been progress in the projection display industry towards incorporating a single reflective LCD, primarily because of the lower cost and weight of single device systems. See U.S. Pat. No. 5,743,612. Of the LCD technologies, the reflective LCD with the silicon backplane can best achieve the high speeds required for color sequential operation. While this increased speed may not be as essential to printing as it is for projection display, the higher speeds can be utilized to incorporate additional gray scale and uniformity correction to printing systems.

While the reflective LCD modulator has enabled low cost digital printing on photosensitive media, the demands of high resolution printing have not been fully addressed. For many applications, such as imaging for medical applications, resolution is critical. Often, the resolution provided by a single reflection LCD modulator is insufficient. It then becomes necessary to create an image wherein multiple images are merged to create a single high-resolution image. Creating a merged image without artifacts along the borders, or in regions where image data may overlap, is desirable. While juxtaposing or spatially interweaving image data alone may have been attempted in previous applications, such a superposition of images with reflective LCDs provides images of high quality without compromising the cost or productivity of the print engine. By utilizing polarization based modulation, a print engine can utilize light already available in the optical system.

While similar methods have been employed in projection systems, the use of a reflective LCD and dual polarization has not been used in the field of printing. In particular, because of the time delay involved in printing, artifacts present in the stitched image, as well as differences between multiple modulators can be corrected. These can be compensated through software adjustments. This approach is difficult for applications such as projection display, particularly motion imaging. Additionally, in a printing system, all three colors used to create a composite image need not be simultaneously displayed as in a projection system.

Modulator printing systems can incorporate a variety of methods to achieve gray scale. Texas Instruments employs a time delayed integration system that works well with line arrays as shown in U.S. Pat. Nos. 5,721,622, and 5,461,410. While this method can provide adequate gray levels at a reasonable speed, line printing Time Delayed Integration (TDI) methods can result in registration problems and soft images. Alternate methods have been proposed particularly around transmissive LCDs such as the design presented in U.S. Pat. No. 5,754,305.

Because photosensitive media responds differently to light of different wavelengths it may be necessary to image one color for a longer period of time than another color. For example, it takes longer to image red on a photosensitive media than it takes to image blue or green.

It is desirable to reduce the time required to expose a photosensitive media to multiple colors. It is also desirable to increase the resolution of a photographic image, using available technology cost, reduce reciprocity failure, while preserving adequate gray scale.

SUMMARY OF THE INVENTION

An object of this invention to provide for a high pixel density color image at a media exposure plane in a silver halide (AgX) printing system; and to provide means by which to utilize a high site density spatial light modulator to create digital images for imaging onto photographic media.

Briefly, according to one aspect of the present invention, a method of printing to a photosensitive media comprises the steps of imaging light from a light source through an optics assembly to a polarization beamsplitter. The polarization beamsplitter produces a first polarized state and a second polarized state. The first polarized state is directed to a first filter to a first spatial light modulator. The first spatial light modulator is addressed with a first color signal to modulate the first polarized beam which is reflected back through the polarization beamsplitter. A second polarized light is passed through a second filter to a second spatial light modulator. A second color signal causes said second spatial light modulator to reflect a second modulated light beam through the polarization beamsplitter. The first and second modulated light beam are focused through print lens onto a photosensitive media. Light emitting diode sources are imaged color sequentially through a polarizer, spatial uniformizing optics and a polarizing beamsplitter to create essentially telecentric illumination at the plane of a spatial light modulator. The spatial light modulator is comprised of a plurality of modulator sites in two dimensions. Individual modulator sites rotate the polarization state of incoming light and reflected light passes again through the polarizing beamsplitter cube. Light is then imaged through a print lens assembly and an additional polarization element onto a media plane. The media is exposed in a color sequential manner with a two dimensional color image. The media is then moved to a second position and a new image is printed.

In one embodiment, the printer incorporates at least two reflective liquid crystal display devices, illuminated by multiple wavelengths, which expose photosensitive media. In the first configuration, two LCDs are placed at opposing facets of a beam splitting cube. White, composite LEDs or white light source, light illumination is divided into TE and TM polarization states by the polarizing beamsplitting cube. One facet of the cube is followed by a red filter or dichroic, the other facet contains blue and green filters switching or rotating, or blue/green dichroics. Light passing through the red filter illuminates a LCD addressed with data corresponding to the red content of an image. Light passing through the blue and green filters illuminates a LCD addressed with the blue and then green content of an image. The light from both facets passes through a single print lens and is recombined at the image plane. Because the red exposure requires a longer exposure time, the blue and green data can be flashed sequentially in the time required to illuminate in red. The media is exposed and advanced.

In a second major embodiment, an alternate light source such as a halogen lamp is used in conjunction with color filters. In a third embodiment images are printed side by side and twice the throughput is achieved.

The invention and its objects and advantages will become more apparent in the detailed description of the preferred embodiment presented below.

DETAILED DESCRIPTION OF THE INVENTION

Figure 1:
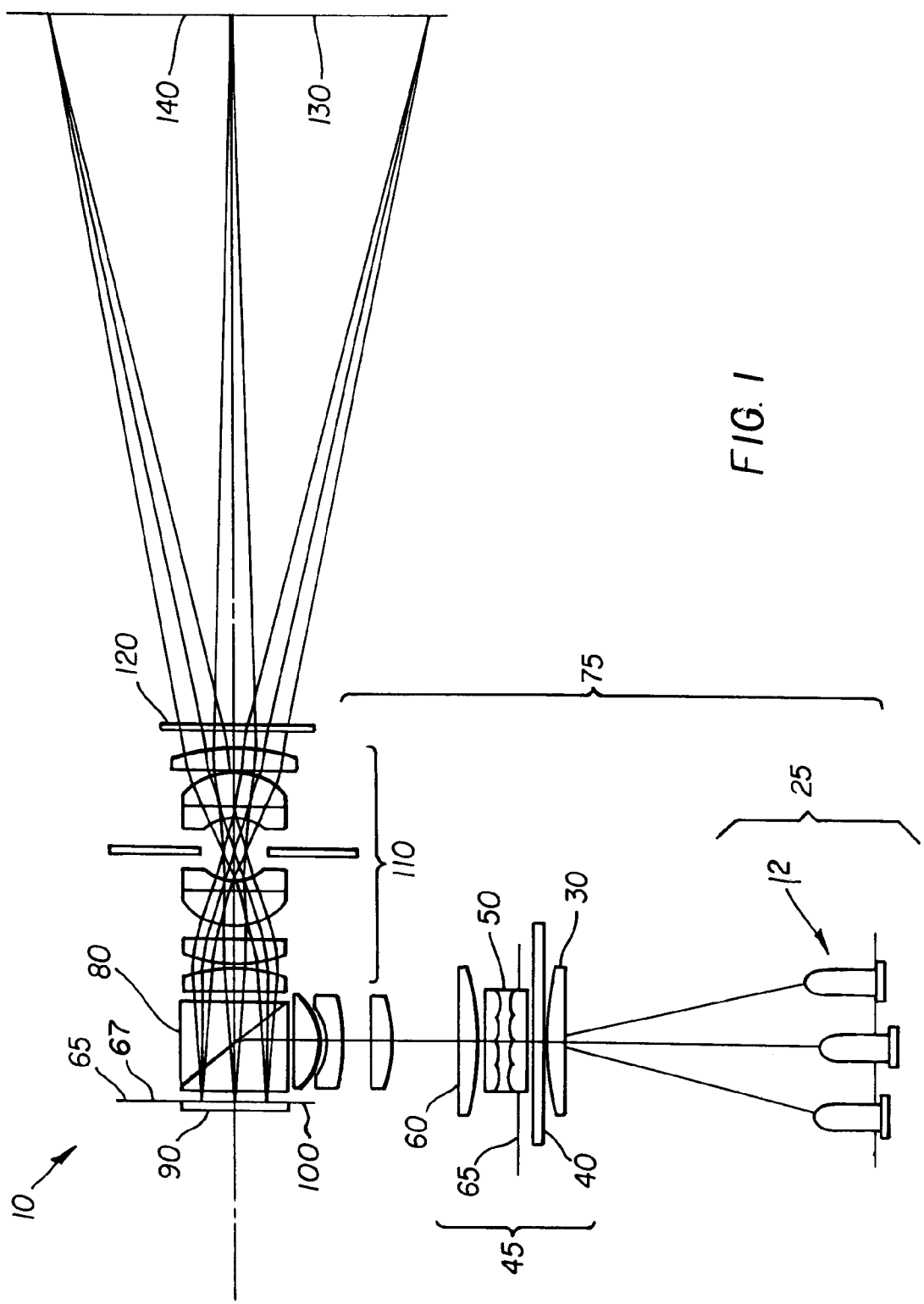
FIG. 1 is a schematic view of a reflective LCD modulator system for printing two-dimensional swaths.

Referring to FIG. 1, there is illustrated a printer referred to in general by numeral 10. The photographic printer is comprised of a light emitting diode (LED) array 25, uniformizing optics 45, polarizing beamsplitter 80, reflective LCD modulator 90, a data path (not shown) for providing image information to the reflective LCD modulator 90, and a print lens assembly 110. The photographic printing system 10 provides a two-dimensional image on light sensitive media 140 located at an image plane 130.

The LED array 25, is arranged in a two-dimensional array. Each of the LEDs emit one of three distinct wavelengths, red, blue, or green. The LEDs 12 are typically mounted in a circular aperture and are arranged such that the colors of emission are spread evenly about the aperture. The relative number of LEDs emitting at a given wavelength is determined by the sensitivity of the media onto which the light is imaged. For example, the array may consist of four red LEDs, two green LEDs, and two blue LEDs. The LEDs are spaced such that a significant fraction of the light emitted can be captured in the collection aperture of the illumination optics 75. Furthermore, redundancy in emitters reduces the system sensitivity to malfunction in any individual LED.

The LEDs 12 are operated in a pulsed and color sequential manner. For any given image, groups of LEDs are activated in order of wavelength. For example, the red LEDs are activated and deactivated, the blue LEDs are activated and deactivated, then the green LEDs are activated and deactivated. Any activation cycle for a given wavelength consists of a series of pulses, which may vary in duration or amplitude. The length and duration of the pulses is determined by the level of illumination needed per image to define the gray scale and by the sensitivity of the light sensitive media 140 to light level and illumination time. It should be noted that certain photosensitive media, which includes but is not limited to photographic paper, photographic film, microfilm, and both wet and dry light sensitive media, require only monochromatic illumination. For such applications, LEDs of a single wavelength are employed and there is no color sequence. It should also be noted that LEDs are suitable for the lower cost applications, but for applications where speed is or throughput is more critical, lasers can be substituted for some or all of the LEDs.

Each of the LEDs 12 is mapped by the illumination optics 75 to cover the area of the reflective LCD modulator 90 in a uniform and essentially telecentric manner at the conjugate plane 65, at the modulator plane 67. This design is unique to printing applications because the requirements for uniformity of illumination and uniformity of image are far more stringent in printing then in projection display. Specifically, the tolerance to roll-off at the edges of the illumination is much greater in a projection system. The telecentricity is required to maintain the uniformity of the image at the image plane 130 due to constraints on the LCD operation. The conjugate planes 65 are shown in FIG. 1 and referred to throughout the remainder of the specification.

The illumination optics 75 is designed to illuminate a nearly square or rectangular aperture. In general, axially symmetric components are employed in the illumination. Following the LEDs 12 are uniformizing optics 45 comprising a field lens 30 that images light to a lenslet array 50 and field lens 60. The light at the intermediate conjugate plane 65 is broken into a number of portions equivalent to the number of elements in the first portion of lenslet array 50. The individual portions are then superimposed and magnified by the second portion of lenslet array 50 and the field lens 60. A condenser lens 70 is positioned immediately before the polarizing beamsplitter 80.

In a single reflective LCD modulator imaging system a linear polarizer 40 may be incorporated in the illumination optics 75 prior to the polarizing beamsplitter 80. However, for a system designed to illuminate multiple devices, the optical system can be modified to incorporate two distinct polarization states by simply utilizing multiple states of polarization produced by the source. Light from the LEDs 12 is randomly polarized. Consequently light of one polarization state passes through the polarizing beamsplitter 80 while light from a second state of polarization is directed at a right angle. The distance from the lenslet array 50 to the plane each of the modulator planes is equidistant for each of the paths.

Figure 2A:
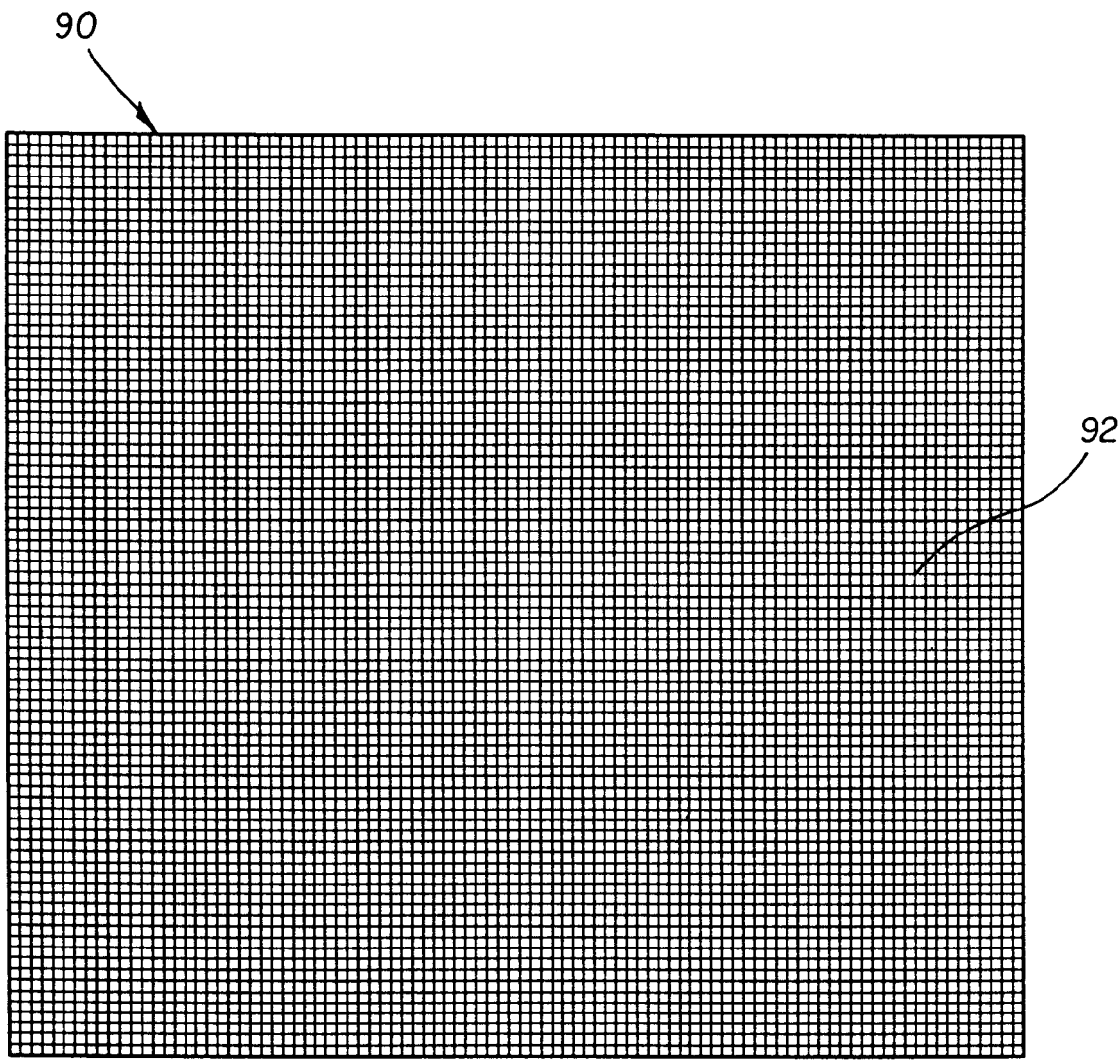
FIGS. 2a and 2b are top plan view and a side view in cross section, respectively, of a reflective LCD modulator.
Figure 2B:
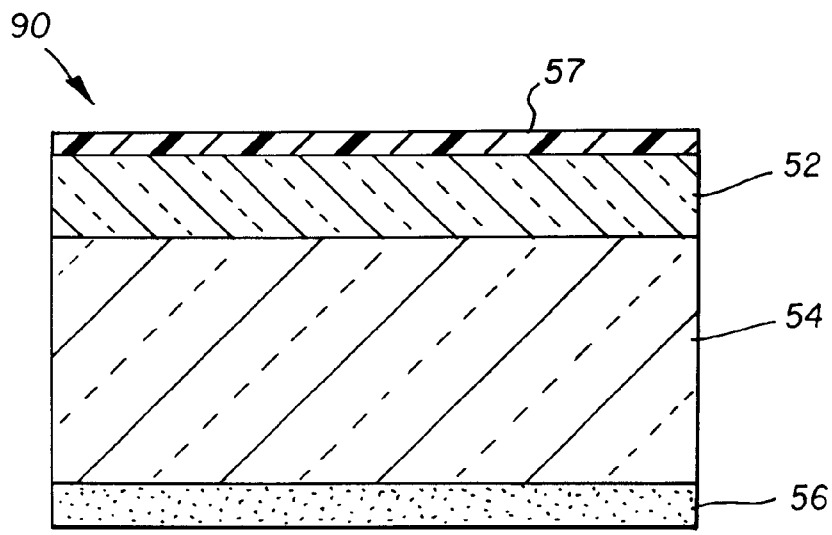

FIGS. 2a and 2b show a top view a reflective LCD modulator 90 as used in the present invention. The reflective LCD modulator 90 consists of a plurality of modulator sites 92 that are individually modulatable. Light passes through the top surface of LCD 52 and liquid crystal material 54, and is reflected off the back plane 56 of the modulator, and returns through the modulator. If a modulator site 92 is "on" or bright, during the round-trip through the reflective LDC modulator 90, the polarization state of the light is rotated. In an ideal case the polarization state of the light is rotated 90 degrees, although this degree of rotation is difficult to achieve. If a given modulator site is "off" or dark, the polarization state of the light is not rotated. The light that is not modulated, i.e., not rotated, is not passed straight through the polarizing beamsplitter 80 but is redirected away from the light sensitive media 140 plane by the polarized beamsplitter 80. It should be noted that the polarization state of the light that is rotated by a reflective LCD modulator 90 may become elliptically polarized, however, upon passing through a linear polarizer 120, shown in FIG. 1, the light will regain linearity. If color discrimination is required at the LCD a color filter 57, color filter array, or switchable color filter can be integrated with the device as is shown in FIG. 2b.

Referring again to FIG. 1 the reflective LCD modulator 90 and the polarized beamsplitter 80 are followed by print lens assembly 110 and a linear polarizer 120. This lens assembly provides the correct magnification or demagnification of the image of the reflective LCD modulator 90 to the image plane 150 where the media light sensitive media 140 is located. The print lens assembly 110 is designed to provide magnification relating to a given image size at the media plane. Once imaged at the media plane, the printer moves the media to a next position and the next image is recorded. In any system on any media on which images are created at multiple wavelengths, the composite tri-color image will be referred to as an image.

The most readily available choice of reflective polarization based modulators is the reflective liquid crystal modulator. Such modulators, originally developed for use in projection display, can have resolutions as high as 4000× 2000 modulator sites. Currently, resolutions of 1200×1600 are available with footprints as small as 0.9 inches diagonal. These high resolution reflective LCD modulators, are often twisted nematic LCDs, or homeotropically aligned reflective LCD modulators, although other types of reflective LCD modulators such as ferroelectric are often employed in projection display. Some of the key characteristics of these LCDs are high resolution; have high contrast (>100:1) in all three primary colors; fast frame rate, 70 frames per second or higher; and high aperture ratio, i.e. greater than 90%. In addition, the incorporation of a CMOS backplane increases the uniformity across the array. The LCDs are also capable of producing an eight bit gray scale either through pulse width modulation or through analog operation. In either case data may be introduced digitally to the printing system. These characteristics ensure that the reflective LCD modulator is an excellent choice for use in a reflective printing system.

The reflective LCD modulator 90 can be designed in a number of different configurations. The most amenable to a low cost printing system is a single chip system used in color sequential mode. Such an LCD may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors. This optical system is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the-dark or "off state." In this state, the polarization state of the light is not rotated and should not be directed thought the polarizing beamsplitter 80 and imaged. If the polarization state of the light is in fact rotated, light will leak through the imaging system and decrease the contrast. Additionally some applications require throughputs greater than what is achievable in a color sequential system. For such applications, multi-chip printing is a good choice.

Figure 3:
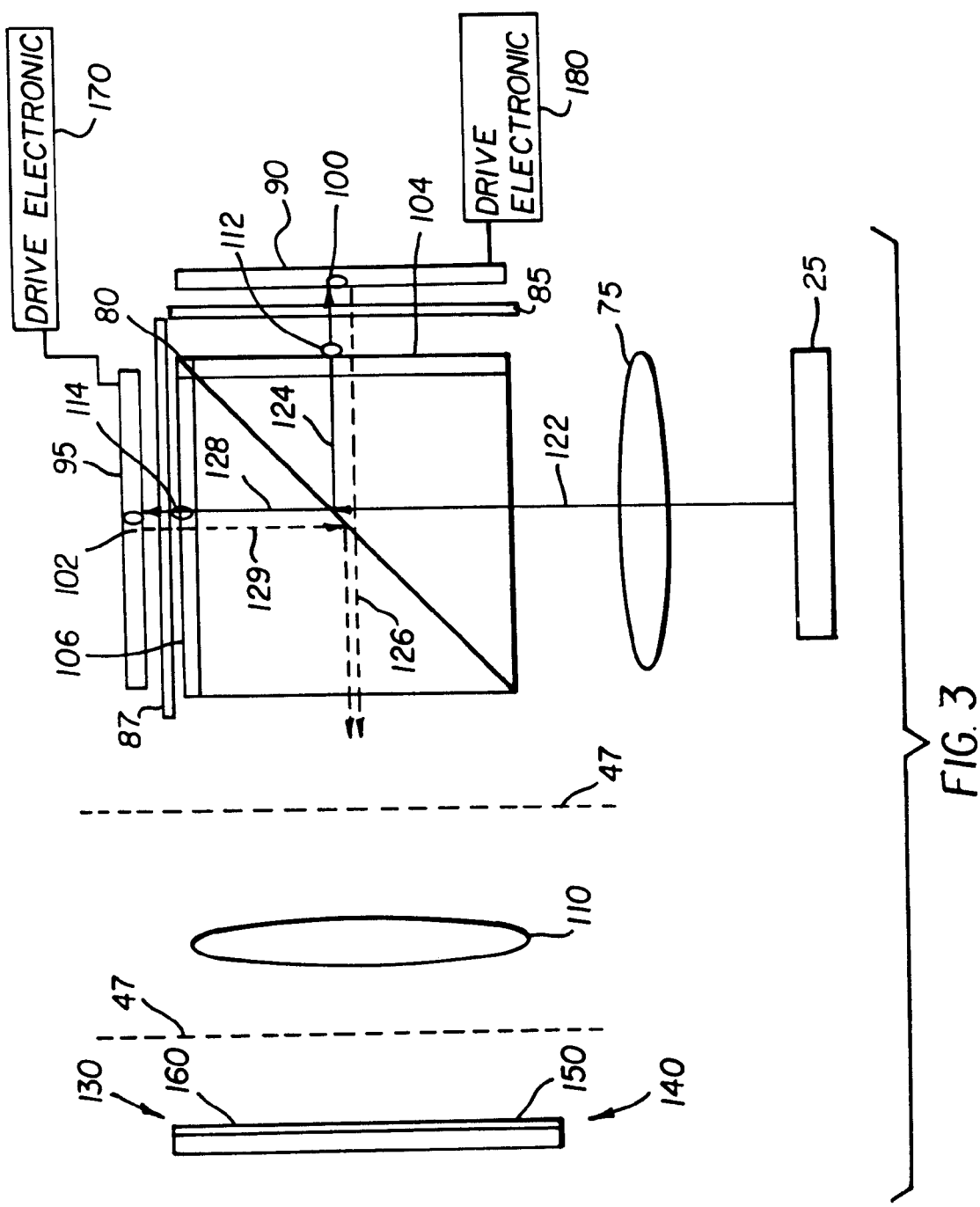
FIG. 3 is schematic views of reflective LCD modulator based printing system utilizing a polarizing beamsplitter and two reflective LCD modulators.

The present invention is designed for is a two dimensional reflective polarization based reflective LCD modulator. FIG. 3 depicts a multiple reflective LCD modulator based optical system. Incident light 122 is comprised of s-polarization state 124, which is redirected by the polarizing beamsplitter 80 to the reflective LCD modulator 90. The p-polarization state 128 passes through the polarizing beamsplitter 80 and to reflective LCD modulator 95. In this manner, the optical system utilizes multiple reflective LCD modulators 90, 95 without reducing the light intensity at the modulator and therefore without inhibiting system productivity. Light impinging on each reflective LCD is modulated and reflected back 126, 129 through the polarizing beamsplitter 80. Modulated light from the reflective LCDs is passed through the polarizing beamsplitter 80 to the print lens assembly 110 assembly and subsequently imaged at the image plane 130 onto the light sensitive media 140. The polarizing beamsplitter cube 80 requires a broadband coating 104, 106. In some cases it is advantageous to include means to color filter in the cube.

The light directed onto the reflective LCD modulators 90, 95 is essentially telecentric. This aspect of the invention sets it apart from systems generally used for projection display. If the light impinging is not telecentric, then modulation across the different angles of incident light is not uniform which will lead to a severe degradation in contrast.

Light impinging on reflective LCD modulator 90 is of the s-polarization state 124. Light that is modulated at reflective LCD modulator 90 is reflected p-polarized 126, and passes through the polarizing beamsplitter 80 to the image plane. Light impinging-on reflective LCD modulator 95 is p-polarized state 128. Modulated light from reflective LCD modulator 95 is reflected s-polarized 129 and passes through the polarizing beamsplitter 80 and is imaged at the image plane 130. Because light directed to the image plane is of opposite polarization states, polarization sensitive elements between the polarizing beamsplitter 80 and the image plane should be avoided.

In some applications, it may be necessary to provide data at one reflective LCD modulator that is the inverse of the data at the other. If the data were inverted, the image at the media plane from one reflective LCD modulator would be the negative of the data from the other reflective LCD modulator. In such a system, a polarizer 47 after the polarizing beamsplitter would pass one image intact, while the data from the LCD for which the polarization state and data are inverted would be further modified. While this provides additional control over image data, it is cumbersome and often unnecessary.

Additionally, because each of the reflective LCD modulators in FIG. 3 is operating on light of opposite initial polarization states, the activation voltage may differ between the two modulators. Ideally, s-polarization is converted to p-polarization at the first modulator, and p-polarization is converted to s-polarization at the second modulator. However, because polarization rotation is not perfect at the modulator, care must be taken in the addressing scheme to allow adequate modulation at each device.

It should be noted that in all embodiments featuring a polarizing beamsplitter 80 and the use of multiple reflective LCD modulators, discussion has centered around the use of two reflective LCD modulators. This approach however, can be generalized to many reflective LCD modulators, as there is sufficient area on each facet of polarizing beamsplitter 80 to accommodate multiple LCDs. Additionally, multiple polarizing beamsplitters and x-prisms may be employed to incorporate multiple devices. For the sake of simplicity, all discussion contained herein refers to two reflective LCD modulators.

One aspect of this invention that separates the design and implementation from-projection displays the contrast required for printing. In particular, photosensitive media may require contrast as low as 30:1 for a particular color. Also, in general, the contrast requirement for red light is more severe than that required for blue light because the media on which data is projected is generally more sensitive to blue light. In projection display systems contrast of greater than 100:1 is often required. Furthermore, contrast requirements are equally stringent in all three colors. The design implications of these differences is significant. With two LCDs the total amount of leakage light passing through the cube in the imaging system would double from that of a single LCD system. Leakage in both polarization stares would degrade the contrast. In single LCD systems, a linear polarizer can be placed after the cube to clean up leakage. Such a solution would be unacceptable in a two LCD system. Use of two separate modulators operating in opposite polarization states, inhibits the use of polarization compensation elements following the polarizing beamsplitter. For example, a polarizer placed to clean up leakage p-polarization light from reflective LCD modulator 95 would increase the contrast of reflective LCD modulator 95. It would concurrently reduce the peak light level and contrast from reflective LCD modulator 90. In a printing application, the loss in contrast may not be catastrophic. For example, contrast may drop from 140:1 to 60:1. The latter contrast is well within the range of may different photographic media, however, it is too low for the average projection system.

Another major difference between the present invention and projection displays stems from the independent color requirements. Because the required contrast for red light printing is often greater than that required for the other colors, a color sequential system is an achievable goal. Specifically, a device and optical system designed primarily around red light is adequate in the blue and green spectrum. So, a single chip color sequential system does not require a special LCD and can be implemented with a device designed for color separated projection. It may be necessary, however, to change the backplane voltage of the LCD as a function of illumination wavelength.

In the embodiment of the invention shown in FIG. 3, the individual images created at the media 140 by the two independent reflective LCD modulators 90, 95 overlap and are registered with zero displacement of the individual images. The centers 100, 102 of the reflective LCD modulators 90, 95 line up with the center of the polarizing beamsplitter facets 112, 114 respectively. Such a system does not increase resolution, but reduces the time required to print by increasing the net light level at the media thus increasing the productivity. Also, site defects may be covered up or compensated. Image information displayed by each modulator may be identical to obtain twice the power, or image information may vary between the modulators to create additional bit depth.

Figure 5:
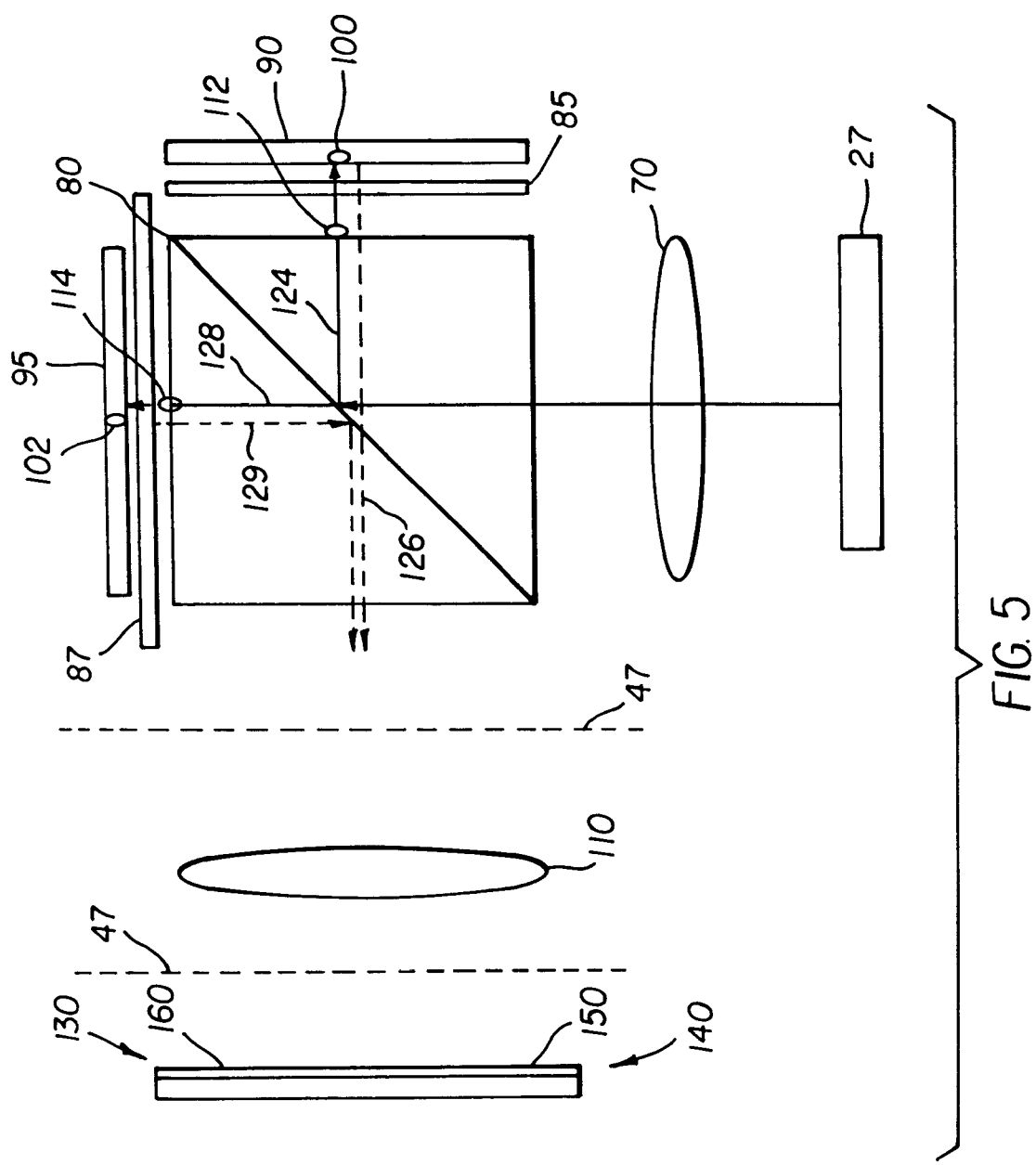
FIG. 5 is a schematic view of a reflective LCD modulator based printing system utilizing a polarizing beamsplitter, two reflective LCD modulators, and a white light illuminator.

In some cases, the contrast is inadequate in all colors. For such cases, a polarization compensator may be introduced in the path of the optical beam at each reflective LCD modulator 90, 95 to correct the polarization state of the light as is shown in FIG. 5. A compensator may be placed in the optical path prior to the polarizing beamsplitter 80 in front of each LCD to particularly correct the off state of the light. However, if the design is to be truly efficient for each wavelength, the system would require three compensators placed sequentially in front of each LCD with the illumination timing.

In order to optimize throughput, one channel of the printer, corresponding a given LCD 90, is used to image the color and corresponding data at the modulator to which the media is the slowest to respond. The alternate LCD 95 is used to sequentially image the remaining two colors and the corresponding data at the modulator in a three color system. From the illumination end, this requires that illumination not occur in a truly sequential manner. The LEDs, red, green, and blue, are turned on simultaneously. Alternatively the slowest exposing color is turned on for the required amount of time, and the remaining colors a re turned sequentially. At the LCD 90, a color filter 85 corresponding to the desired color is employed to eliminate the remaining two colors. At the second LCD 95, a filter on turret, or a switchable filter 87 is employed to sequentially allow transmission of the remaining two wavelengths. It should be understood that both LCDs 90, 95 can incorporate filters that rotate or switch to accommodate multiple wavelengths (in excess of 3 is possible). The filters may be incorporated into the LCD. For LCDs switching between colors, the backplane voltage and operating conditions of the LCD ( gain, offset, etc.) may also vary as a function of illumination wavelength.

In the described embodiment, the filters are placed in close proximity to the liquid crystal. It is possible, particularly for two-color systems, to incorporate the filters with the beamsplitting cube. Alternatively, the cube can be replaced by a pellicle beamsplitter with or without filters. In the case of a pellicle beamsplitter, either the beamsplitter must incorporate polarization elements, or polarizers must be placed before and after the pellicle.

Figure 4B:
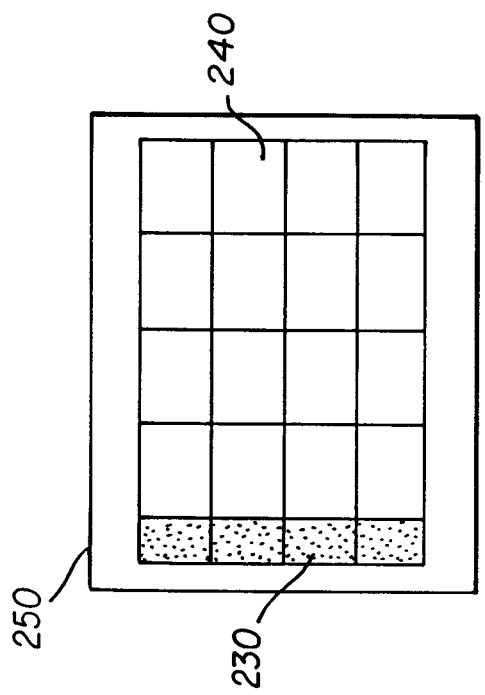
FIGS. 4a through 4d depict a four step dither at the image plane.
Figure 4D:
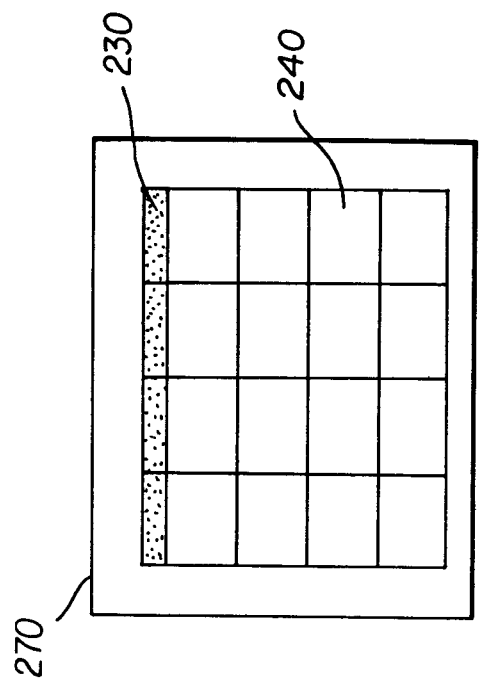
Figure 4A:
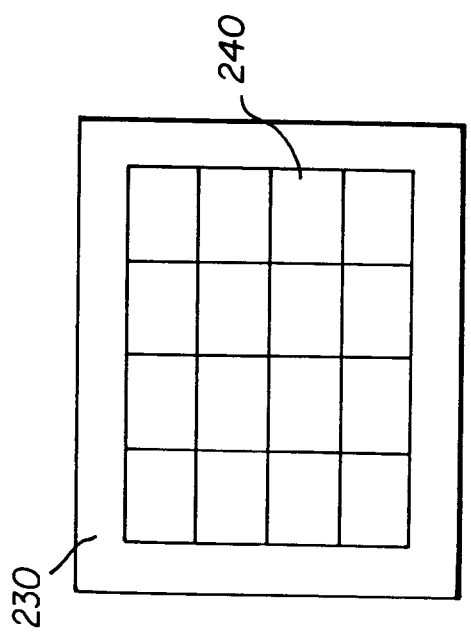
Figure 4C:
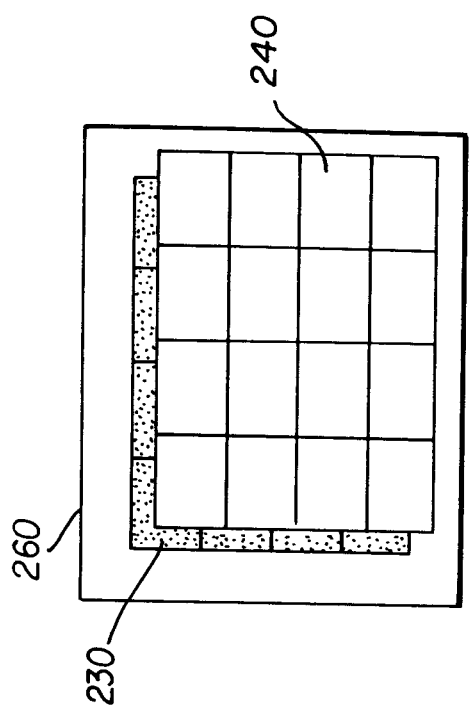

To increase resolution of the printing system, the combination of LCDs may be used to increase resolution. One of the issues when printing with a two-dimensional modulator is the effect of modulator site defects. Another possible issue is a need to increase resolution for larger print sizes. Both these issues can be addressed through dithered printing. To dither a full aperture LCD is to image the modulator 90 at one position, reposition the modulator 90 a fraction of a modulator site distance away and image it again. In so doing, multiple images are created and overlapped. By overlapping multiple images, the system acquires a redundancy that corrects for modulator site failure or drop out. Furthermore, by interpolating and updating the data between positions, the effective resolution is increased. One particular dithering scheme is depicted in FIGS. 4a–4d. First, modulator 90 is positioned at a given position 230 and modulator sites 240 are positioned and imaged (FIG. 4a). Modulator 90 is then moved to a second position 250 (FIG. 4b) one half of a modulator site laterally displaced from previous position 230. Modulator 90 is then imaged at position 250. Modulator 90 is then displaced one half of a modulator site longitudinally from previous position 250, (FIG. 4c) which means the new position 260 is diagonally displaced from initial position 230. Modulator sites 240 are illuminated and the media exposed again. Modulator 90 is then moved to a fourth position 270 (FIG. 4d) which laterally displaced from third position 260. The media is then exposed at this position. Effectively, there is a four times increase in the amount of data written. This serves to increase image resolution and provide means to further sharpen images. With a high aperture ratio, it may be sufficient to simply dither in one diagonal direction to achieve comparable results.

When printing with a LCD, the device itself ensures some level of subaperturing on a pixel by pixel basis. For this reason, the actual data content in an image can be doubled when the gap regions are over-written.

Dithering requires motion of each modulator in two directions. Each motion is approximately between 5 um and 20 um for a typical reflective LCD modulator. In order to achieve this motion, many different actuator or motion assemblies can be employed. For example, the assembly can use two piezo-electric actuators. In a multi-chip system it reduces complexity if the LCDs are dithered simultaneously and for the same distance. However, because of different exposure requirements the dither mechanisms may not be easily synchronized. Additionally, the dither distances must be identical for similar devices for the imaged pixels to register properly for devices that are similar dimensioned. For different LCDs the distances may differ.

In an alternate embodiment shown in FIG. 5, the light source may be a white light source such as halogen lamp. Because imaging is not color sequential and filters are used to sort the wavelengths, the source can be a white light source.

Figure 7:
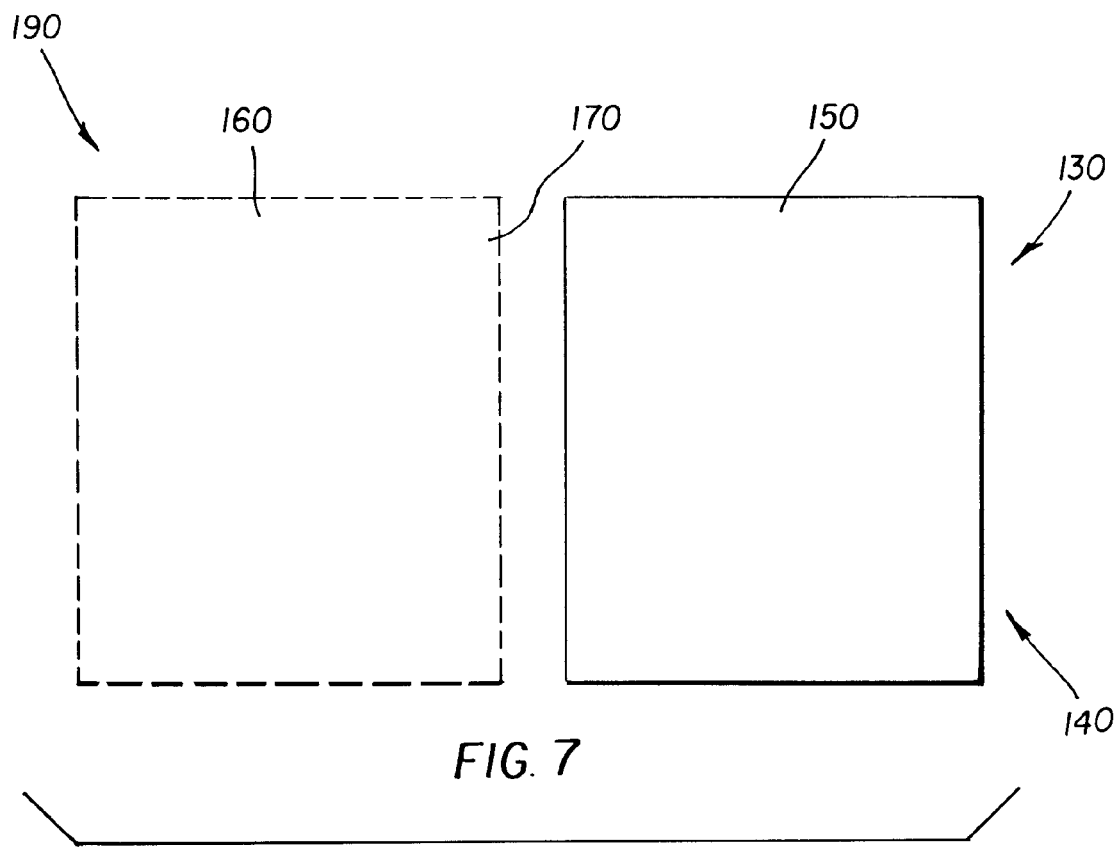
FIG. 7 is the image plane of multiple images.
Figure 6:
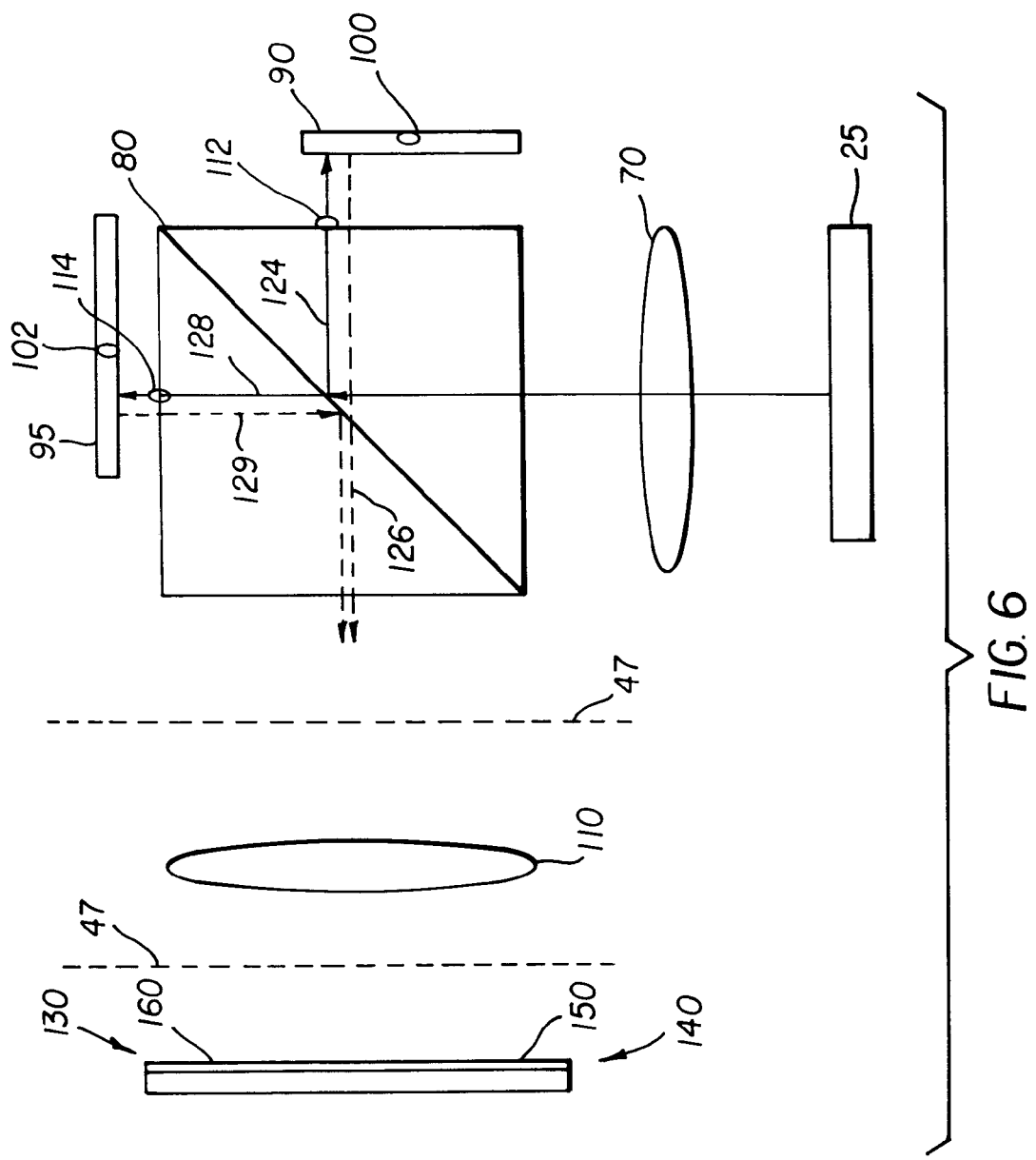
FIG. 6 is a schematic view of reflective LCD modulator based printing system utilizing a polarizing beamsplitter and two reflective LCD modulators printing side by side.

In a third embodiment depicted in FIG. 6, the center 100,102 of each LCD 90,95 is significantly displaced from the center of the beamsplitting 112, 114 cube. This system uses a color sequential mode, where each device prints red green and blue data sequentially. (LEDS, lasers can be used, or white light with filters). Because the devices are displaced and images printed "multi-up," the effective throughout is twice that of a single chip color sequential system. The resulting image at the media plane is shown in FIG. 7. The resulting image on the light sensitive media 140 is comprised of two distinct images 150, 160. The images 150 and 160 need not be oriented in the same direction to provide different format images simultaneously. This approach can be generalized of many LCDs along a facet to incorporate the beamsplitting cube length.

One of the key aspects governing this printing system, which is applicable to all embodiments, is the means used to achieve sufficient uniformity while retaining the gray scale. The reflective LCD modulator 90 alone can receive up to 8 bits of bit depth. However, 8 bits to the modulator may not translate to 8 bits at the media. To print an adequate gray scale, additional bit depth must be provided. Furthermore, reflective LCD modulators are known to have some measure of roll-off or loss of contrast at the edges of the device. To address both these issues, the print system takes advantage of the fact that modulators designed for projection display generally refresh data faster then required for printing. Consequently, it is possible to create a single color image at the media as a super-position of a series of images of a given color. The individual images that comprise the final image vary both in information content and illumination.

First, every image to each modulator is broken into the three basic color components. Information corresponding to the red content of the image is displayed on the modulator. Within each color, multiple frames of image data are displayed on the modulator. Once an acceptable frame is displayed on the modulator, the first illumination pulse is employed. Following the recording of the initial frame of data, a subsequent frame is displayed on the modulator. The illumination level of the subsequent frame is altered according to the density requirements at the media. Similarly, as many frames as may be needed are introduced at the modulator and imaged at the media with the illumination adjusted accordingly. It is possible to maintain the same image data at the modulator and by altering the illumination level alone, introduce additional bit depth. By varying the illumination level, and/or duration, and by altering the information content, the system can build a composite image out of a series of preliminary images. The superposition of the images in a given color of varied information content and varied illumination level introduces additional bit depth to the composite image. Once a given color is printed the same procedure is repeated with the data and illumination corresponding to the next color.

Creating a balanced composite image comprised of several images provides many challenges both in gray scale generation as well in elimination of artifacts. When multiple LCDs are employed each LCD transmission and gray scale profile must be mapped. The image data transmitted to each LCD must reflect the characteristics of that device, for the illumination of the system. For example, the reflective LCD modulator 90 in FIG. 3 may have higher transmission characteristics than the reflective LCD modulator 95. The corresponding image data must reflect the discrepancy and balance it out. There are several ways to balance such a discrepancy. First, each device can be loaded with its own electro-optic response curve. The top surface of LCD 52 and backplane of LCD 56 voltages can be set independently. The code values can be mapped differently to the two devices. For example, code value or gray scale value of 200 provided by the drive electronic 170 for reflective LCD modulator 90 may actually be a shorter pulse duration in a pulse width scheme or a lower drive voltage in analog scheme than code value or gray scale value of 200 provided by the drive electronic 180 for reflective LCD modulator 95, if reflective LCD modulator 95 does not have an equal transmission characteristic, or the net light level reaching or departing reflective LCD modulator 95 is lower than reflective LCD modulator 90, such correction would be required. Each device will require it's own gray scale calibration. It is possible for devices that are mapping 14–16 bit tables to an 8-bit device, and then the same driver board may be employed, with different mappings of the two devices. In the case of interwoven images, this balancing is the primary adjustment.

The second concern in the imaging system is to correct non-uniformities in the print. The exposure system can correct for some non-uniformities such as roll-off at the modulator edges. One way to accomplish this is to introduce additional image data to the modulator activating only the edge modulator sites. These images are exposed and superimposed on the other images thus giving additional depth to the edge regions. An example method would be to scan a series of images taken at the reflective LCD modulators 90, 95, create data maps, and convolve all input data with initial maps of the reflective LCD modulators 90, 95 to correct the image. Similar techniques can be used to adjust for modulator non-uniformities that are known prior to operation.

Another concern is image quality and the presence of artifacts.

Each device will need it's own gray scale and individual uniformity map. In the cases of image juxtaposition or stitching of images, image data needs to reflect the gray scale, the device uniformity, and the regions of overlap need to be balanced with the non-overlapped regions of the image.

For the embodiments utilizing multiple LCDs the gray scale needs to be established as a function of both devices. This may require a different e-o curve for that region or simply a different mapping of code values. Such an algorithm may require use of multiple exposures to isolate overlap data from non-overlap data. If this is not possible the image data should be adjusted or offset such that the composite image produces the same gray scale as non-overlapped regions.

If dithering is employed gray scale generation, uniformity correction, and artifact reduction should be mapped as a function of the dither. Because of the digital addressability of the reflective LCD modulator and the pulsed LED illumination method of illumination, this approach to printing provides an adequate bit depth and reasonable timing for use in a photographic printer.

The invention has been described in detail with particular reference to certain preferred embodiments thereof, but it will be understood that variations and modifications can be effected within the scope of the invention. For example, this method of printing can be utilized for light sensitive media. Also, print lens can be used for magnification or demagnification.

10. Printing system
12. Light emitting diodes (LEDs)
25. LED array
30. Field lens
40. Polarizer
45. Uniformizing optics
47. Polarizer position
50. Lenslet array
52. Top surface of LCD
54. Liquid crystal material
56. Backplane of LCD
57. Color filter
60. Field lens
65. Conjugate planes
67. Modulator planes
70. Condenser lens
75. Illumination optics
80. Polarizing beamsplitter
85. Color filter
87. Color filter
90. Reflective LCD modulator
92. Modulator site
95. Reflective LCD modulator
100. Center of reflective LCD modulator 90
102. Center of reflective LCD modulator 95
104. Color filter
106. Color filter
110. Print lens assembly
112. Center of beamsplitter element facet 104
114. Center of beamsplitter element facet 106
120. Linear polarizer
122. Incident light
124. S-polarization state
126. Reflected p-polarization light
128. P-polarization state
129. Reflected s-polarization light
130. Image plane
140. Light sensitive media
150. Image of reflective LCD modulator 90
160. Image of reflective LCD modulator 95
170. Drive electronics
180. Drive electronics
230. Initial LCD position
240. Modulator site
250. Second modulator position
260. Third modulator position
270. Fourth modulator position dithering

What is claimed is:

1. A method of printing two-dimensional swaths of area onto a photosensitive media comprising the steps of:

imaging light from a light source through an optics assembly;

passing said light from said optics assembly through a polarization beamsplitter element to produce a first polarization state of said light and a second polarization state of said light;

directing said first polarized light to a first color filter;

passing said first polarized light from said first color filter to a first spatial light modulator to create an essentially telecentric illumination at said first spatial light modulator;

addressing said first spatial light modulator with a first color signal to create a first modulated light beam;

imaging said first modulated light beam through a print lens assembly on said photosensitive media;

directing said second polarized light to a second color filter;

passing said second polarized light from said second color filter to a second spatial light modulator to create an essentially telecentric illumination at said second spatial light modulator;

addressing said second spatial light modulator with a second color signal to create a second modulated light beam;

imaging said second modulated light beam through the print lens assembly on said photosensitive media;

addressing said second spatial light modulator with a third color signal to create a third modulated light beam;

imaging said third modulated light beam through the print lens assembly on said photosensitive media; and wherein said second signal and said third color signal are processed simultaneously with said first color signal.

2. A method according to claim 1 wherein said first color signal is red.

3. A method according to claim 1 wherein said second color signal is green and said third color signal is blue.

4. A method according to claim 1 wherein said first color filter is part of said first spatial light modulator.

5. A method according to claim 1 wherein said second color filter is part of said second spatial light modulator.

6. A method according to claim 1 wherein said first color filter is integral with said beamsplitter.

7. A method according to claim 1 wherein said second color filter is integral with said beamsplitter.

8. A method according to claim 1 wherein said first color filter is switchable between multiple wavelengths.

9. A method according to claim 1 wherein said second color filter is switchable between multiple wavelengths.

10. A method according to claim 1 wherein at least one of said spatial light modulators is moved to spatially dither at least one of said modulated light beams.

11. A method according to claim 1 wherein said first spatial light modulator and said second spatial light modulator are moved in synchronization to dither said first modulated light beam and said second modulated light beam.

12. A method according to claim 1 wherein said light source is selected from a group comprised of LEDs, halogen light sources, or lasers.

13. A method according to claim 1 wherein said first color filter is a red filter.

14. A method according to claim 1 wherein said second color filter is a switchable blue and green filter.

15. A method according to claim 1 wherein said second color filter is a color filter wheel.

16. A method according to claim 1 wherein said light source produces a first, second, and third color simultaneously.

17. A method according to claim 1 wherein said light source produces a first color continuously and a second and third color sequentially.

18. A method according to claim 1 wherein said second filter is a multiple wavelength filter.

* * * * *